US012639547B2

(12) United States Patent
Guerin et al.

(10) Patent No.: US 12,639,547 B2
(45) Date of Patent: May 26, 2026

(54) CHIP CARD WITH OPTIMIZED COUPLING ANTENNAS AND METHOD FOR THE PRODUCTION THEREOF

(71) Applicant: Smart Packaging Solutions, Rousset (FR)

(72) Inventors: Guillaume Guerin, Rousset (FR); Luc Lefebvre, Rousset (FR); Stephan Danler Baumgartner, Rousset (FR)

(73) Assignee: Smart Packaging Solutions, Rousset (FR)

( * ) Notice: Subject to any disclaimer, the term of this patent is extended or adjusted under 35 U.S.C. 154(b) by 0 days.

(21) Appl. No.: 18/998,449

(22) PCT Filed: Jul. 22, 2023

(86) PCT No.: PCT/FR2023/000136
§ 371 (c)(1),
(2) Date: Jan. 24, 2025

(87) PCT Pub. No.: WO2024/023399
PCT Pub. Date: Feb. 1, 2024

(65) Prior Publication Data
US 2026/0044704 A1 Feb. 12, 2026

(30) Foreign Application Priority Data
Jul. 28, 2022 (FR) ...................................... 2207807

(51) Int. Cl.
G06K 19/077 (2006.01)
(52) U.S. Cl.
CPC .............................. G06K 19/07773 (2013.01)

(58) Field of Classification Search
CPC ................................................ G06K 19/07773
(Continued)

(56) References Cited

U.S. PATENT DOCUMENTS

2012/0055013 A1* 3/2012 Finn ..................... H01Q 1/2225
29/600
2019/0102663 A1 4/2019 Danler-Baumgartner et al.
(Continued)

FOREIGN PATENT DOCUMENTS

EP 1031939 A1 8/2000
EP 3543913 A1 9/2019

OTHER PUBLICATIONS

PCT International Search Report and Written Opinion, Application No. PCT/FR2023/000136, mailed Nov. 16, 2023, 12 pages. English language translation included.

*Primary Examiner* — Toan C Ly
(74) *Attorney, Agent, or Firm* — McDonnell Boehnen Hulbert & Berghoff LLP

(57) ABSTRACT

Example embodiments relate to chip cards with optimized coupling antennas and methods for the production thereof. An example contactless or mixed contact and contactless chip card includes a chip card body and an antenna insert interposed between outer layers of the chip card body. The antenna insert includes a substrate. The antenna insert also includes on at least one side of the substrate, coils of a concentrator configured to be electromagnetically coupled to coils of an antenna of an electronic module arranged in a cavity of the chip card body. The concentrator includes at least one inner coil that emerges in the cavity and is flush with inner side walls of the cavity of the chip card body.

14 Claims, 10 Drawing Sheets

(58) Field of Classification Search
USPC .......................................................... 235/492
See application file for complete search history.

(56) References Cited

U.S. PATENT DOCUMENTS

| 2022/0172015 A1 | 6/2022 | Gerin et al. |
| 2024/0185020 A1 | 6/2024 | Marmugi et al. |

\* cited by examiner

CHIP CARD WITH OPTIMIZED COUPLING ANTENNAS AND METHOD FOR THE PRODUCTION THEREOF

CROSS-REFERENCE TO RELATED APPLICATIONS

The present application is a national stage entry of PCT/FR2023/000136 filed Jul. 22, 2023, which claims priority to FR 2207807 filed Jul. 28, 2022, the contents of each of which are hereby incorporated by reference.

The disclosure relates to antennas of the type used for contactless or mixed contact and contactless chip cards or for other security documents that might use such antennas.

BACKGROUND

The known antennas for such chip cards are generally incorporated into a multi-layer antenna insert comprising a substrate typically made from plastic, often PET (polyethylene terephthalate), comprising antenna traces formed by etching layers of aluminum, together with a stack of a plurality of thin layers also made from plastic.

The antenna is generally configured in the form of two sets of coils, forming a first antenna referred to as an ID1 antenna the coils of which are large in size, close to the size of the chip card, intended to be electromagnetically coupled to an external reader, and a second antenna referred to as a concentrator antenna (also more simply known as a concentrator). This concentrator antenna is intended to be electromagnetically coupled to the antenna of the electronic module and it is electrically connected in series or in parallel to the ID1 antenna.

A network of adjustable capacitors incorporated into both the ID1 and concentrator antennas makes it possible to cause the entire antenna system to resonate at a predetermined operating frequency. Antenna system is therefore given to mean the ID1 antenna, the concentrator antenna, and the adjustable capacitors making it possible to adjust the resonance frequency of the antenna insert.

The aforementioned antenna system is electromagnetically coupled to an electronic module that is also provided with an antenna, arranged on the periphery of the electronic module and referred to as the antenna of the module, whether it is for example the electronic module of a contactless chip card or an electronic passport. The antenna of the module is limited in terms of the number of coils by the small size of the electronic module, which must also receive a microelectronic chip and optionally galvanic contacts in accordance with ISO 7816-2, for example for so-called dual cards for mixed contact and contactless operation.

In the known embodiments of some antenna inserts, the ID1 antenna and the concentrator are formed in particular by very narrow etched aluminum traces arranged on a PET substrate, and the adjustable capacitors are formed by metal pads situated on either side of the substrate of the booster antenna. The coils of the ID1 and concentrator antennas can be formed on a single side of the insert, or on both sides. To close the electrical circuit, a crimp is usually used, that is, an electrical connection formed by crimping or stamping in order to connect metal pads situated on either side of the substrate of the antenna insert. The metal traces of the antennas typically have a thickness of the order of 10 to 30 micrometers, and the thickness of the dielectric substrate is of the order of 25 to 38 micrometers, which makes it possible to obtain radiofrequency operating performance in accordance with the standards in force (ISO 14443 and ISO 10373-6).

EP 3 543 913 A1 discloses a chip card provided in an antenna insert for a contactless chip card or a mixed contact and contactless chip card intended to be interposed between outer layers of a chip card body. This antenna insert comprises a substrate and, on at least one side of said substrate, coils of a concentrator intended to be electromagnetically coupled to the coils of an antenna of an electronic module arranged in a cavity of the card body. However, the inner coil of the concentrator is offset relative to the antenna of the module, which is detrimental to the quality of the coupling between the two antennas.

Example embodiments will be described with reference to the usual terminology of the components of a contactless chip card or a dual chip card, it being understood that it can be transposed without limitation to other products of a different format, such as electronic passports.

The electronic module of the chip card is inserted, in a known manner, into a cavity made in the card body, particularly by machining using a milling cutter. This cavity comprises two areas of different depths, namely an area referred to as P2, which corresponds to the deeper machining depth and in which the encapsulation drop that protects the microelectronic chip of the module is housed, and an area referred to as P1, which corresponds to a shallower machining depth and defines an area on which the peripheral antenna of the electronic module rests.

The cavity of the module is machined when all of the layers of the chip card have been assembled, and the antenna insert is held between the outer layers of the card body. For a standard-thickness module, that is a module having a thickness of the order of 500 micrometers, the machining of the area P2 generally passes through the antenna insert, which is situated at a depth of approximately 400 micrometers, while the shallower machining depth of the area P1 does not reach the depth of the antenna insert.

In order to preserve the functionality of the coils of the ID1 and concentrator antennas of the insert, there must not be any traces situated in the area P2 that will be machined. However, in order to ensure satisfactory electromagnetic coupling between the concentrator antenna of the insert and the antenna of the electronic module, the coils of the concentrator must also be as close as possible to the coils of the antenna of the electronic module. The coupling is defined by the geometric similarity between two antennas and by the distance between them. Thus, in order to define the interaction between the concentrator antenna and the antenna of the module, the greater the distance separating them, the less satisfactory the coupling, which will have a detrimental effect on performance. The first inner coils of the concentrator are therefore the most important and must be as close as possible to the trace coils of the antenna of the module in order to maximize this performance, and have as many coils as possible in as small a footprint as possible.

These two simultaneous conditions are already difficult to achieve for a standard-thickness module, due to the positioning tolerances of the antenna insert during the assembly of the layers of the chip card, which are of the order of 1 to 2 mm. They become even more difficult to achieve when the module used is a so-called "thick" module, that is a module that requires a cavity in which the areas P1 and P2 are both deep, and both require machining that passes through the layers of the antenna insert. This is typically the case for modules known as dCVV or dynamic card verification value modules, in which both depths of the areas P1 and P2 are greater than 500 micrometers. In this scenario, the coils of the concentrator antenna cannot be situated sufficiently close to the coils of the electronic module, which results in poor radiofrequency communication performance of typical chip cards provided with such modules.

SUMMARY

Some embodiments provide an improved antenna insert structure, in particular for the body of a contactless chip card or for an electronic passport, without the aforementioned drawbacks.

Some embodiments provide an antenna insert structure for a contactless chip card or equivalent, ensuring optimized coupling with the antenna of an electronic module intended to be incorporated into the card body, regardless of the thickness of the module, that is in particular whether it is a standard module or a so-called "thick" module, particularly a dCVV module with a thickness of more than 500 micrometers.

Some embodiments provide a method for producing a chip card using the optimized antenna insert according to example embodiments.

According to the principle of some embodiments, the solution to the aforementioned problem consists in creating on the antenna insert an inner concentrator coil that emerges directly in the cavity, on the side walls thereof, and that is wider than the others, in any case sufficiently wide to compensate for the positioning tolerance of the antenna insert between the other layers of the card body, during the assembly of the antenna insert with the other layers of the chip card.

In order to form this wider inner coil, a concentrator blank provided with a substantially solid metal central area is produced, then the insert provided with this blank is placed between the other layers of the card body, and finally the cavity of the card body and the substantially solid central metal area of the antenna insert is machined, so that after machining, an inner concentrator coil remains on the antenna insert that emerges directly in the cavity and is flush with the side walls thereof. The wider inner coil that remains after the machining of the cavity of the module thus makes it possible both to absorb the positioning tolerances of the antenna insert in the card body, and to place this inner coil of the concentrator as close as possible to the coils of the antenna of the electronic module, as can be seen in the figures.

This method and this concentrator antenna configuration can be used whichever of the areas P1 and P2 of the module passes through the antenna insert, that is, whether it is a standard module or a thick module.

The disclosure therefore relates to an antenna insert for a contactless or mixed contact and contactless chip card intended to be interposed between outer layers of a chip card body, said antenna insert comprising a substrate and on at least one side of said substrate, coils of a concentrator intended to be electromagnetically coupled to the coils of an antenna of an electronic module arranged in a cavity of the card body, characterized in that said concentrator comprises at least one inner coil that emerges in the cavity and is flush with the inner side walls of said cavity of the chip card body.

According to some embodiments, said inner coil of the concentrator is wider than the other coils of the concentrator.

According to some embodiments, the width of said inner coil of the concentrator is greater than the value of the positioning tolerance of the antenna insert between the outer layers of a chip card body. This makes it possible to compensate for the lateral positioning tolerance of the insert between the layers of a chip card body and prevent the inner coils of the concentrator from being cut during the machining of the cavity.

According to one embodiment, when the positioning tolerance of the antenna insert in the card body is less than 2 mm, the width of said inner coil is greater than approximately 2.2 mm.

According to one embodiment, the concentrator is a single-sided antenna, all of the coils of which are arranged on a single side of the substrate of the insert, and which comprises a single inner coil emerging in the cavity.

According to one variant embodiment, the concentrator is a double-sided antenna, the coils of which are distributed between the two opposite sides of the substrate of the antenna insert and are connected in series or in parallel by means of using a via or a crimp, said concentrator comprising two inner coils on either side of the substrate and emerging in the cavity.

The disclosure also relates to a method for producing a chip card provided with an antenna insert as defined above, characterized in that it comprises steps of:

Forming on at least one side of a substrate an antenna insert blank having a substrate bearing a plurality of etched aluminum coils and an unetched solid central part;

Arranging said antenna insert blank between outer layers and laminating them together to form a card body;

Machining one side of the card body to form a cavity therein intended to receive an electronic module, said cavity passing through said solid central part of the antenna insert blank and said substrate, so that after machining of the cavity, said central part leaves behind an inner concentrator coil that is flush with the inner side walls of the cavity;

Depositing a layer of adhesive on the periphery of the module;

Transferring and fixing in said cavity an electronic module the periphery of which is provided with traces of a module antenna, so that said antenna traces of the module are adjacent to the inner trace of the concentrator, or facing said inner trace of the concentrator.

BRIEF DESCRIPTION OF THE DRAWINGS

Further features will become apparent on reading the detailed description and with reference to the appended drawings.

DETAILED DESCRIPTION

Figure 1A:
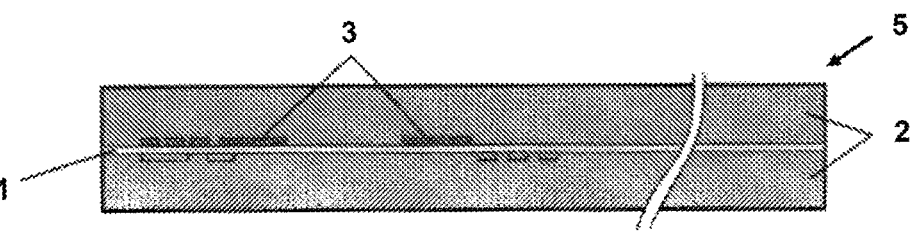
FIG. 1A shows a cross-sectional view of a known chip card during a phase of milling the cavity and inserting a standard-thickness module.
Figure 1B:
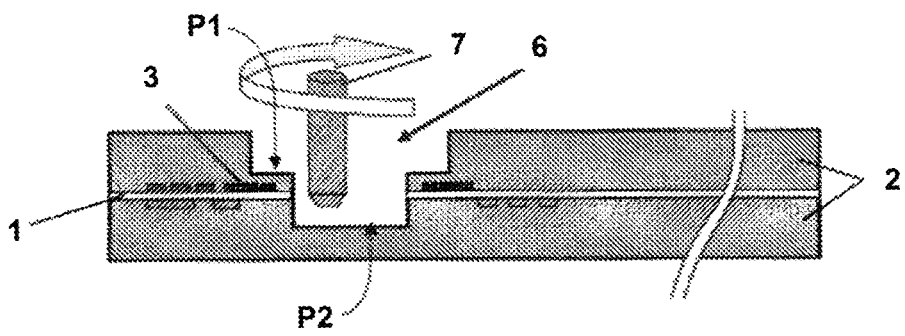
FIG. 1B shows a cross-sectional view of a known chip card during a phase of milling the cavity and inserting a standard-thickness module.

Reference is made to FIGS. 1A to 1E, which show the steps of producing a dual chip card provided with an antenna insert 1 according to the prior art. This antenna insert is provided with coils 3 forming a concentrator, and the other coils shown form part of other components of the insert, such as for example an ID1 antenna. This antenna insert 1 is first laminated between outer layers 2 in order to obtain a card body 5 (FIG. 1A). After the lamination of the card body, a cavity 6 is machined using a milling cutter 7 in this card body 5 (FIG. 1B). The milling cutter 7 machines one cavity portion to a depth P2 and another wider cavity portion to a depth P1. As the depth P2 is greater than half the thickness of the card body 5, this machining passes through the antenna insert 1, which means that the inner coil 3a of the concentrator 3 must be situated a certain distance 15 from the inner side wall of the cavity machined to the depth P2 (FIG. 1D), so that the machining of the area P2 does not damage the concentrator 3, and in particular its inner coil 3a, during said machining.

Figure 1C:
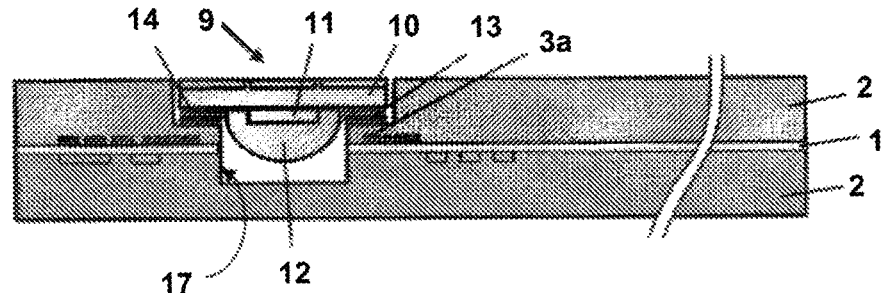
FIG. 1C shows a cross-sectional view of a known chip card during a phase of milling the cavity and inserting a standard-thickness module.
Figure 1D:
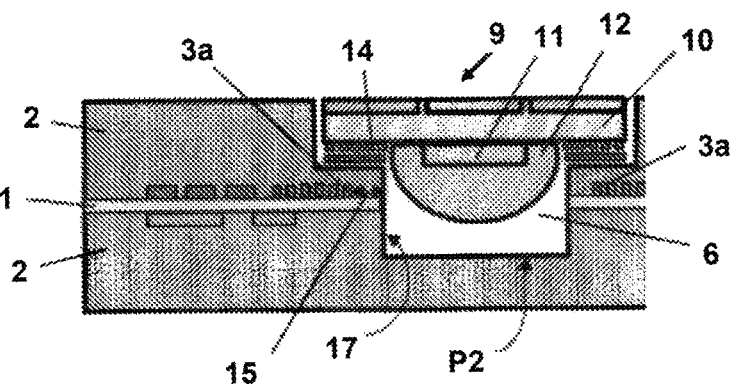
FIG. 1D shows a cross-sectional view of a known chip card during a phase of milling the cavity and inserting a standard-thickness module.
Figure 1E:
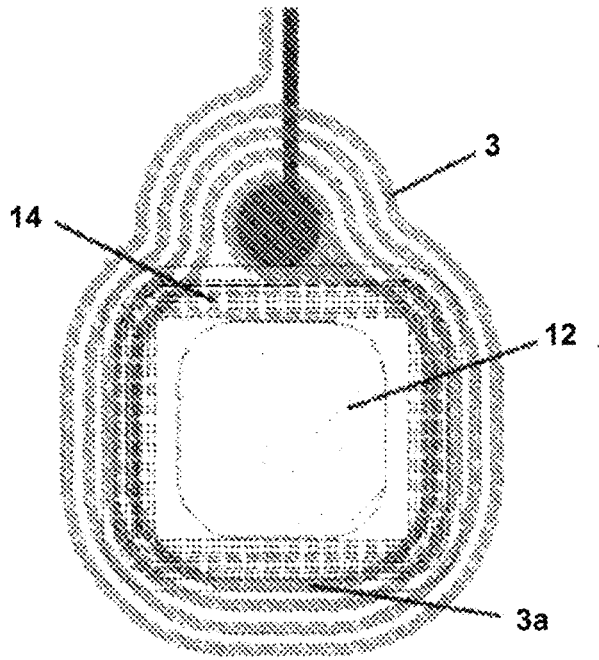
FIG. 1E shows a top view of the relative positioning of the coils of a single-sided concentrator and the coils of the antenna of the module in FIGS. 1A to 1D.

Once the cavity 6 has been machined, a chip card electronic module 9 is inserted into it (FIGS. 1C, 1D). The module comprises a substrate 10 on which contacts, in particular in ISO 7816-2 format, are formed, and under which a microelectronic chip 11 is fixed, protected by a drop of encapsulating resin 12. This electronic module 9 is fixed in the cavity 6 using a layer of adhesive 13 placed between the antenna 14 of the electronic module 9 and the bottom of the cavity 6 at the depth P1 (FIGS. 1C, 1D). As shown more clearly in the enlarged view 1D of FIG. 1C, the lateral positioning tolerance of the antenna insert 1 requires that a certain distance 15 be maintained between the inner coil 3a of the concentrator 3, and the inner side walls 17 of the cavity 6, to avoid the risk of cutting the inner coil 3a of the concentrator during the machining of the cavity 6. This distance 15 causes an offset between the coils of the concentrator 3 and the coils of the antenna 14 of the module, which is detrimental to a satisfactory coupling coefficient between the antenna 14 of the electronic module and the concentrator 3. The positioning of the coils of the concentrator 3, particularly its inner coil 3a, is shown in solid lines in FIG. 1E, which is a top view (in which the ISO contacts of the module are not shown), and the coils of the antenna 14 of the electronic module are shown in dashed lines.

Figure 2A:
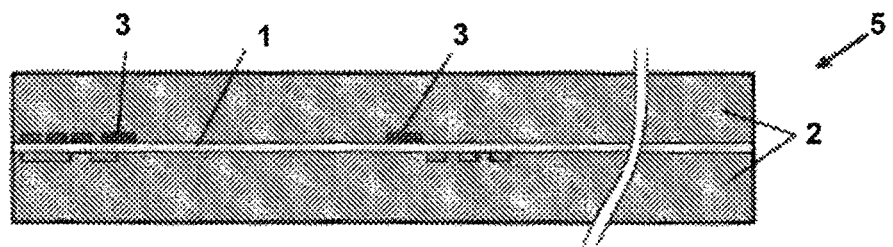
FIG. 2A shows a cross-sectional view of a known chip card during a phase of milling the cavity and inserting a thick dCVV module.
Figure 2B:
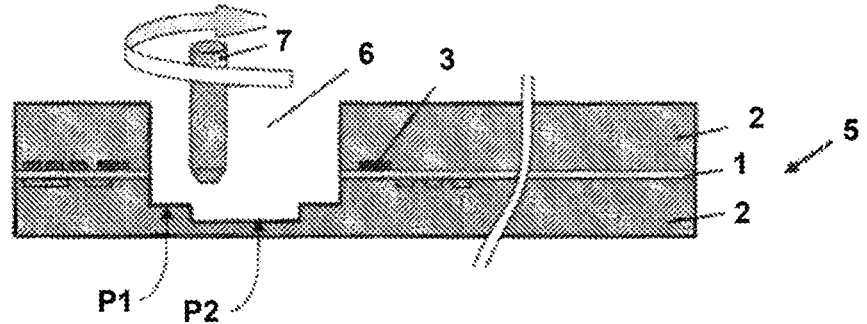
FIG. 2B shows a cross-sectional view of a known chip card during a phase of milling the cavity and inserting a thick dCVV module.
Figure 2C:
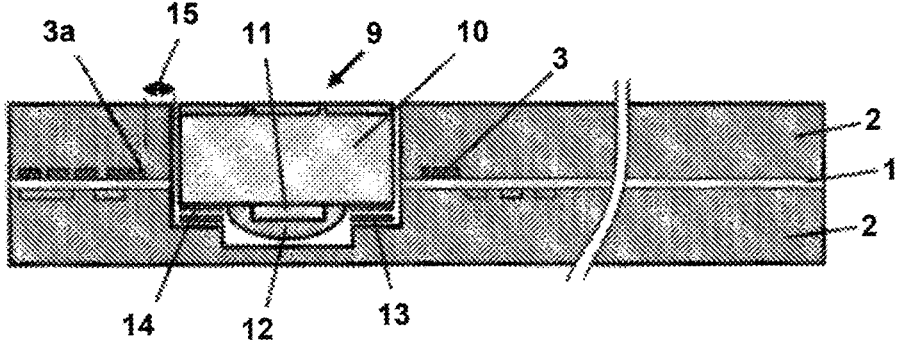
FIG. 2C shows a cross-sectional view of a known chip card during a phase of milling the cavity and inserting a thick dCVV module.
Figure 2D:
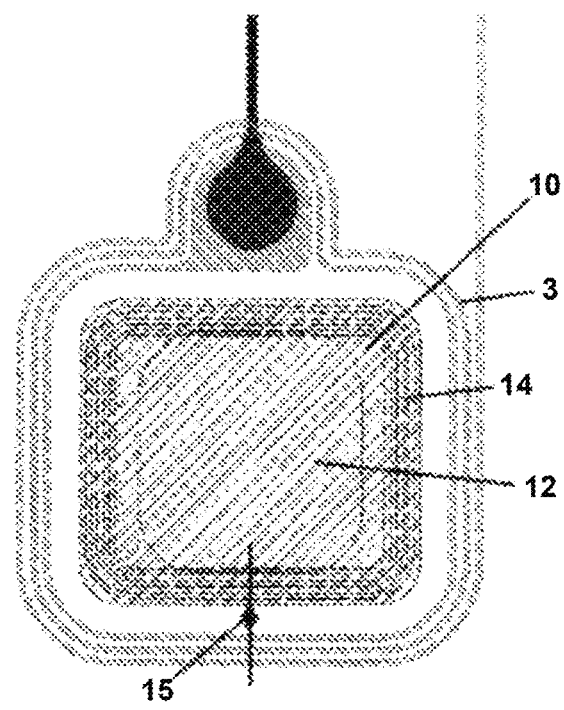
FIG. 2D shows a top view of the relative positioning of the coils of the concentrator and the coils of the antenna of the module in FIGS. 2A to 2C.

The problem of creating an offset 15 persists when the standard electronic module used in FIGS. 1A to 1E is replaced by a thicker module that requires a cavity the depths P1, P2 of which are both situated beyond the depth at which the antenna insert 1 is situated, as shown in FIG. 2 FIGS. 2A to 2D, particularly in FIGS. 2C and 2D.

Figures 3A, 3B, 3C, 3D:
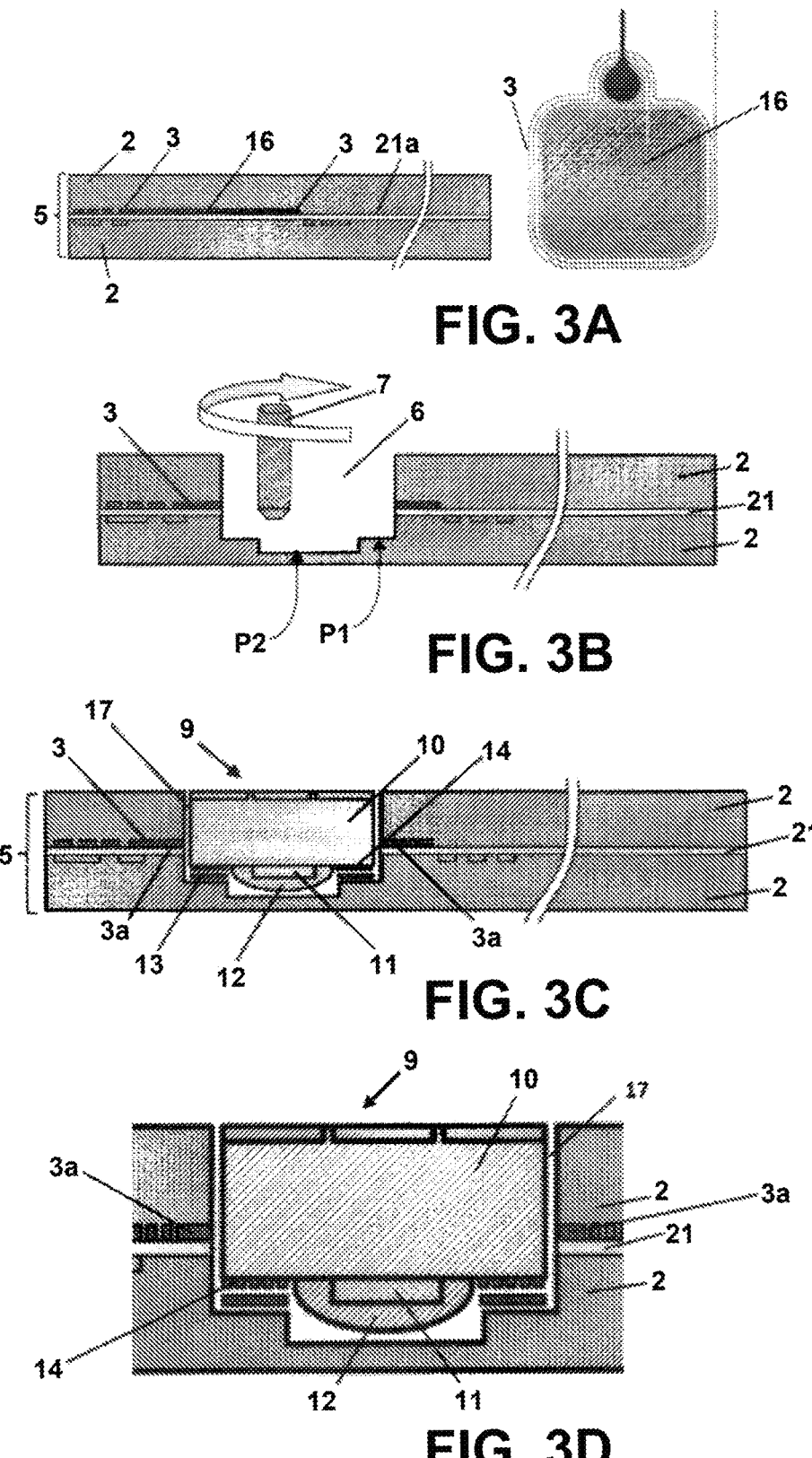
FIG. 3A shows a view of a chip card during a phase of milling the cavity and inserting a thick electronic module into the cavity, according to example embodiments.
FIG. 3B shows a view of a chip card during a phase of milling the cavity and inserting a thick electronic module into the cavity, according to example embodiments.
FIG. 3C shows a view of a chip card during a phase of milling the cavity and inserting a thick electronic module into the cavity, according to example embodiments.
FIG. 3D shows a view of a chip card during a phase of milling the cavity and inserting a thick electronic module into the cavity, according to example embodiments.
Figure 3E:
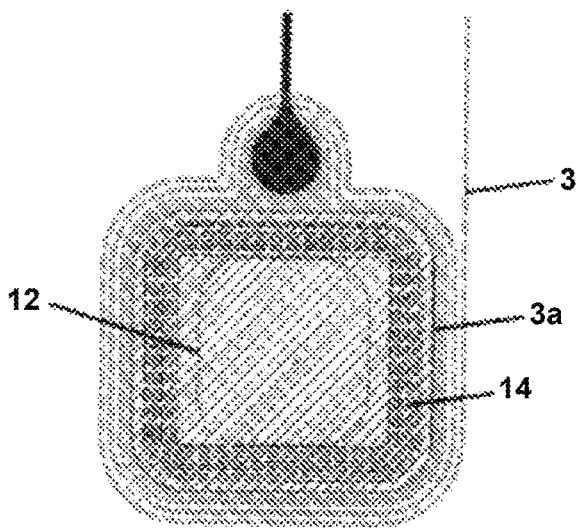
FIG. 3E shows a top view of the relative positioning of the coils of the concentrator and the coils of the antenna of the module in FIGS. 3A to 3D, according to example embodiments.

In order to overcome this problem, some embodiments include the structure and method shown schematically in FIGS. 3A to 3E. As shown in FIG. 3A, an antenna insert blank 21a is used that comprises a concentrator formed by its coils 3 on its periphery, the center of the concentrator being formed initially by a substantially solid metal central part 16. The right-hand part of FIG. 3A shows a top view of the area of the concentrator 3, with a hatched part corresponding to the future position of the module 9. Once the antenna insert blank 21a has been laminated between the outer layers 2 of the card body, the cavity 6 of the card body is machined as shown schematically in FIG. 3B, which results in the removal of the solid central part 16 of the antenna insert blank 21a leaving, in line with the cavity 6, an inner concentrator coil 3a that emerges directly in the cavity 6 and is flush with the inner side walls 17 of the cavity 6. An antenna insert 21 according to the disclosure is thus obtained, incorporated between the outer layers 2 of the card body 5. An electronic module 9 provided with its antenna 14 is then inserted in a traditional manner into the cavity. As can be seen in FIG. 3D, which is an enlargement of FIG. 3C, and in the top view in FIG. 3E, there is now almost no distance between the outer coil of the antenna 14 of the module and the inner coil 3a of the antenna insert 21 (apart from the very small clearance allowing the module 9 to be inserted into the cavity 6). These two coils 3a and 14 are now contiguous in fact, and positioned at potentially different depths. In any event, for an electronic module 9 of a given thickness, these two coils are now much closer than in the configuration in FIGS. 1A-1E and 2A-2D, as the distance 15 (FIG. 1D) due to the lateral positioning tolerance of the insert in the card body has been eliminated. This increased proximity between the coils of the concentrator 3 and the coils of the antenna 14 of the electronic module 9 makes it possible to achieve improved coupling between the antenna of the electronic module and the antenna of the antenna insert. In addition, the distance between the inner coil 3a of the concentrator 3 and the outer coil of the antenna 14 of the module is now constant, for a given type of module.

Figures 4A, 4B, 4C, 4D:
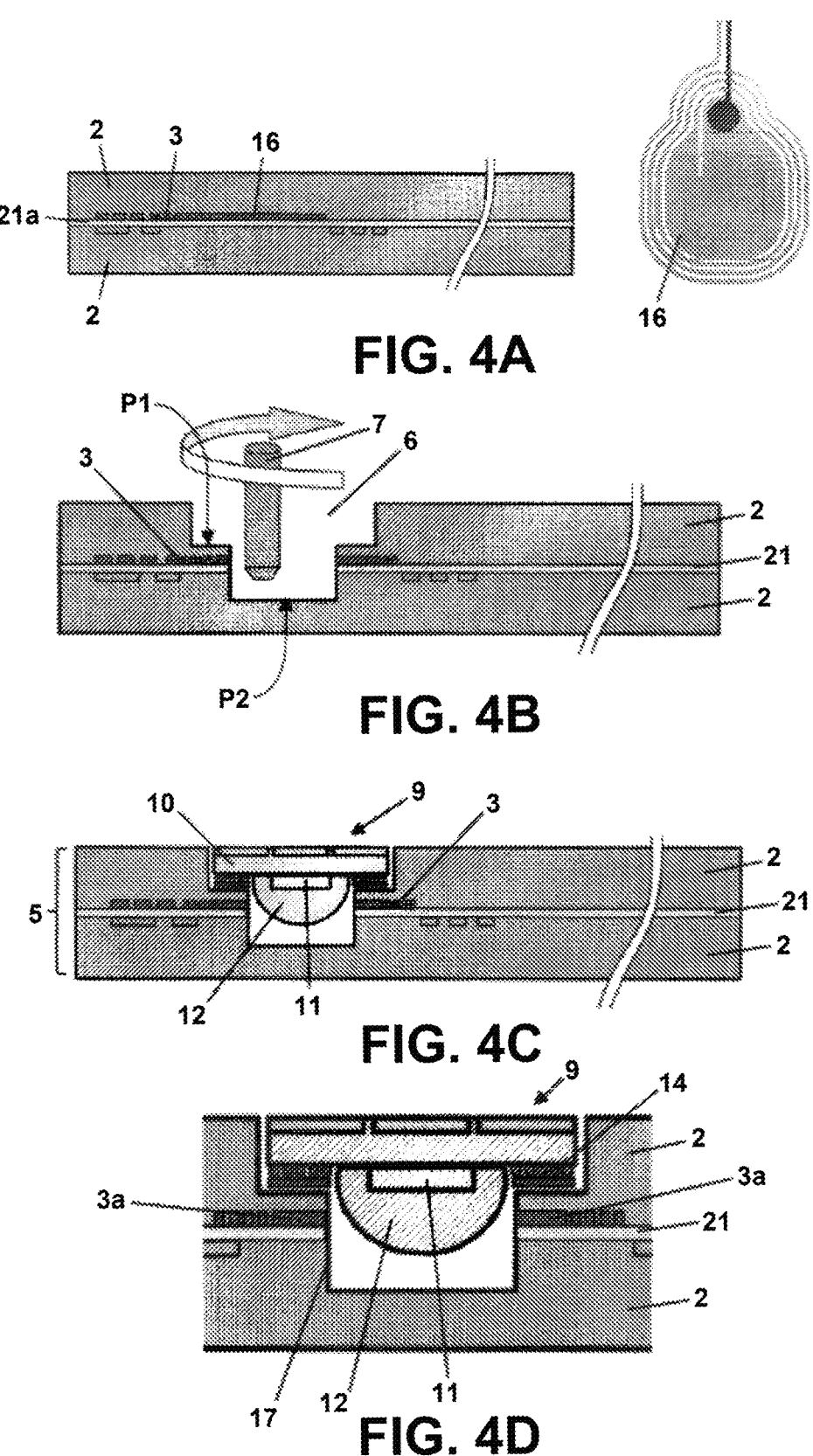
FIG. 4A shows a view of a chip card, provided with a single-sided antenna insert, during a phase of milling the cavity and inserting a standard-thickness module, according to example embodiments.
FIG. 4B shows a view of a chip card, provided with a single-sided antenna insert, during a phase of milling the cavity and inserting a standard-thickness module, according to example embodiments.
FIG. 4C shows a view of a chip card, provided with a single-sided antenna insert, during a phase of milling the cavity and inserting a standard-thickness module, according to example embodiments.
FIG. 4D shows a view of a chip card, provided with a single-sided antenna insert, during a phase of milling the cavity and inserting a standard-thickness module, according to example embodiments.
Figure 4E:
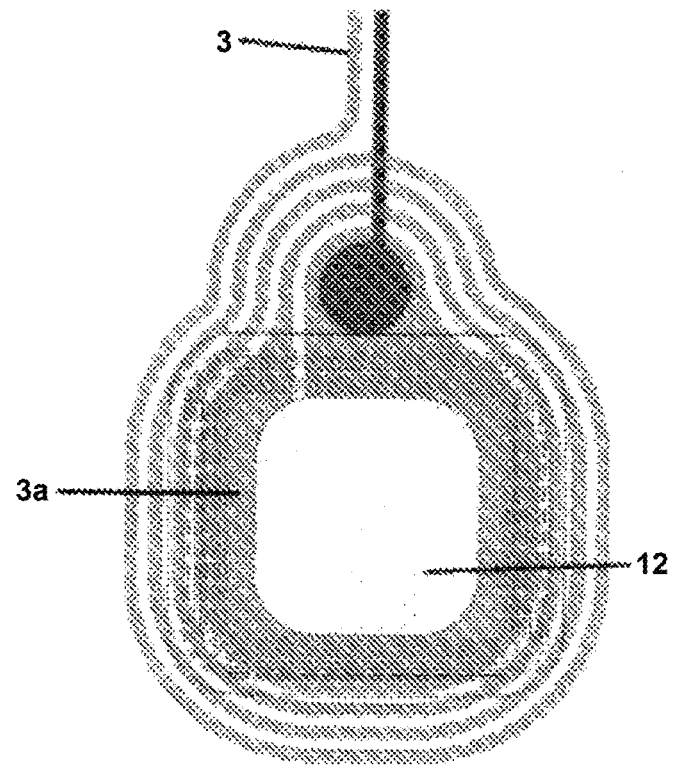
FIG. 4E shows a top view of the relative positioning of the coils of the concentrator and the coils of the antenna of the module in FIGS. 4A to 4D, according to example embodiments.

FIGS. 4A to 4D are similar to FIGS. 3A to 3D, with the exception that the electronic module 9 used is a standard-thickness module, so that the area P1 of the cavity 6 does not pass through the antenna insert 21. As can be seen in FIG. 4B, in this scenario, only the machining to the depth P2 passes through the antenna insert 21. As a result, the inner coil 3a of the concentrator is now directly facing the coils of the antenna 14 of the electronic module, which produces optimized coupling (FIG. 4D).

Figures 5A, 5B, 5C:
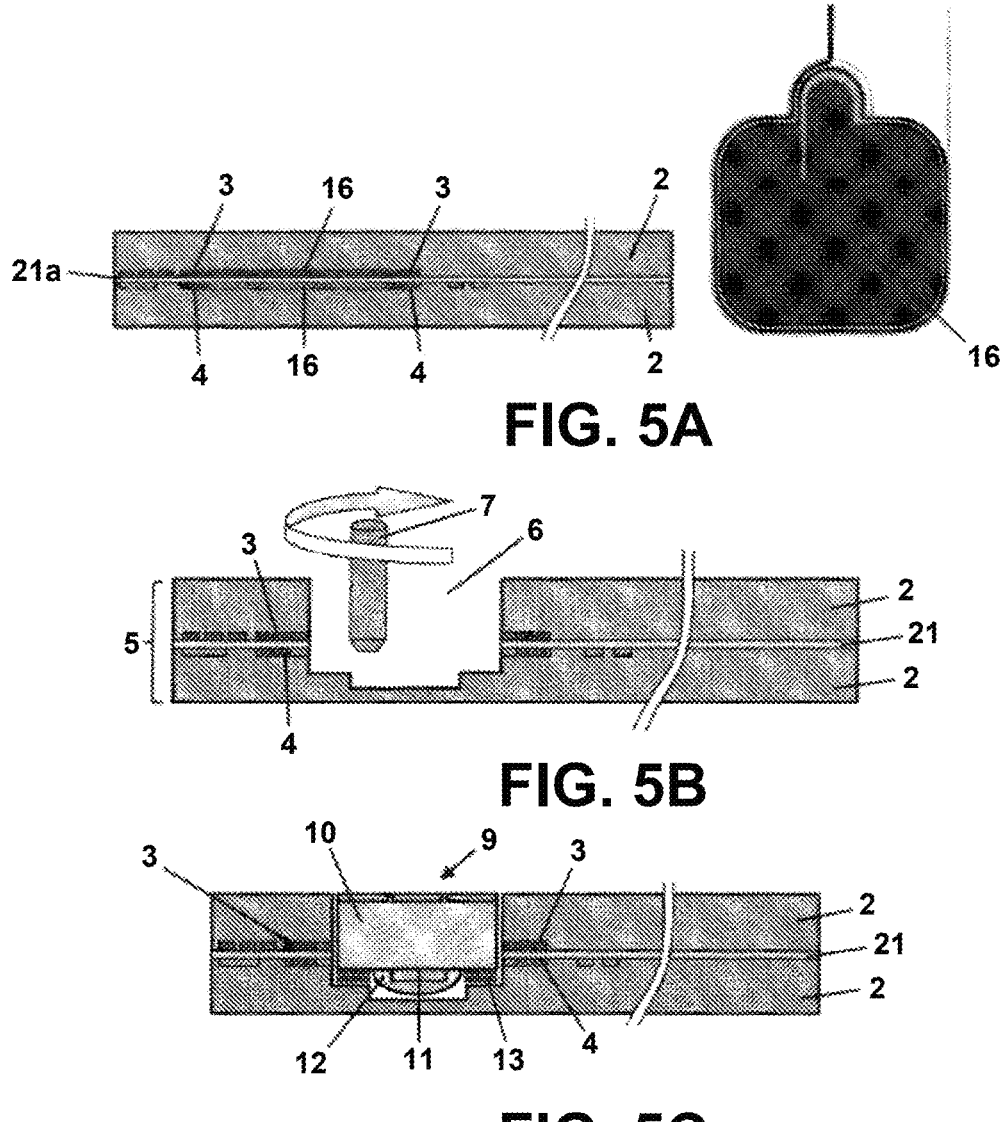
FIG. 5A shows a view of a chip card, provided with a double-sided concentrator antenna insert, during a phase of milling the cavity and inserting a thick module, according to example embodiments.
FIG. 5B shows a view of a chip card, provided with a double-sided concentrator antenna insert, during a phase of milling the cavity and inserting a thick module, according to example embodiments.
FIG. 5C shows a view of a chip card, provided with a double-sided concentrator antenna insert, during a phase of milling the cavity and inserting a thick module, according to example embodiments.
Figures 5D, 5E:
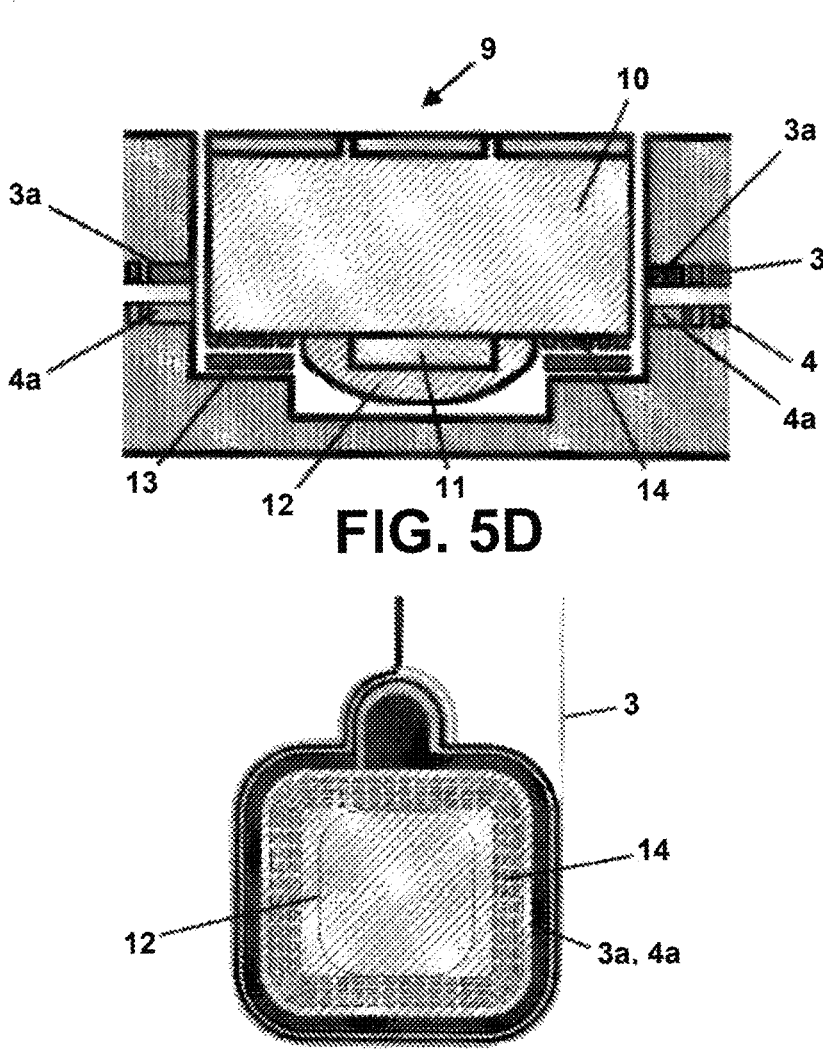
FIG. 5D shows a view of a chip card, provided with a double-sided concentrator antenna insert, during a phase of milling the cavity and inserting a thick module, according to example embodiments.
FIG. 5E shows a top view of the relative positioning of the coils of the concentrator and the coils of the antenna of the module in FIGS. 5A to 5D, according to example embodiments.

FIG. 5 is similar to FIGS. 3A to 3E, with the exception that the antenna insert 21 now comprises a two-sided concentrator, the coils 3, 4 of which are distributed on either side of the substrate of the insert. In this case, a concentrator blank 21a is initially used that is provided with two substantially solid metal central parts 16, one on each side of the substrate. When a thick electronic module is used, a cavity 6 is machined in this case (FIG. 5B) in which the two areas P1, P2 pass through the insert blank, which removes the solid metal central areas 16 on both sides of the concentrator blank, leaving on the inner walls 17 of the cavity inner coils 3a, 4a (FIG. 5D) that emerge in said cavity 6, which again minimizes the distance between these inner coils 3a, 4a of the two-sided concentrator 3, 4 and the coils of the antenna 14 of the electronic module, thus improving the coupling between the two-sided concentrator and the antenna 14 of the module.

CONCLUSION

Ultimately, some embodiments make it possible to achieve the stated aims. It particularly makes it possible to eliminate the negative impact of the positioning tolerances of the antenna insert on the communication performance of a chip card provided with an antenna insert according to example embodiments, by bringing the inner coils of the concentrator closer to the coils of the antenna of the module, which results in an increase in the coupling factor between these two antennas.

In addition, the distance between the inner coil 3a of the concentrator 3 and the outer coil of the antenna 14 of the module is now constant, for a given type of module.

The novel structure does not require any significant modification of the method for assembling the antenna inserts in the card bodies. Only the method for producing the inserts is modified, by using a concentrator blank having a substantially solid metal central part before a machining phase that removes this substantially solid metal central part and finalizes the geometry of the concentrator and the antenna insert.

This method and this concentrator antenna configuration can be used whichever of the areas P1, P2 of the module passes through the antenna insert and whatever the machining depths of the cavity of the module.

The invention claimed is:

1. A contactless or mixed contact and contactless chip card, comprising:
   a chip card body; and
   an antenna insert interposed between outer layers of the chip card body, wherein the antenna insert comprises:
   a substrate; and
   on at least one side of the substrate, coils of a concentrator configured to be electromagnetically coupled to coils of an antenna of an electronic module arranged in a cavity of the chip card body, wherein the concentrator comprises at least one inner coil that emerges in the cavity and is flush with inner side walls of the cavity of the chip card body.

2. The chip card of claim 1, wherein the inner coil of the concentrator of the antenna insert is wider than other coils of the concentrator.

3. The chip card of claim 2, wherein a width of the inner coil of the concentrator is greater than a value of a positioning tolerance of the antenna insert between the outer layers of the chip card body.

4. The chip card of claim 3, wherein, when the positioning tolerance of the antenna insert in the chip card body is less than 2 mm, the width of the inner coil is greater 2.2 mm.

5. The chip card of claim 1, wherein the concentrator is a single-sided antenna, wherein all coils of the single-sided antenna are arranged on a single side of the substrate of the antenna insert, and wherein the single-sided antenna comprises a single inner coil emerging in the cavity of the chip card body.

6. The chip card of claim 1, wherein the concentrator of the antenna insert is a two-sided antenna, wherein the coils of the two-sided antenna are distributed between two opposite sides of the substrate of the antenna insert and are connected in series or in parallel using a via, a crimp, or a capacitor, and wherein the concentrator comprises two inner coils emerging in the cavity of the chip card body.

7. A method for producing the chip card of claim 1, wherein the method comprises:
   forming an antenna insert blank comprising the substrate having a plurality of etched aluminum antenna coils and an unetched substantially solid central part;
   arranging the antenna insert blank provided with the plurality of etched aluminum antenna coils between outer layers and laminating them together to form the chip card body;
   machining one side of the chip card body to form a cavity therein, wherein the cavity is configured to receive an electronic module, wherein the cavity passes through a solid central part of the antenna insert blank, so that after machining of the cavity, the solid central part forms an inner concentrator coil that is flush with the inner side walls of the cavity;
   depositing a layer of adhesive on a periphery of the electronic module; and
   transferring and fixing in the cavity an electronic module, wherein a periphery of the electronic module is provided with traces of a module antenna, so that the traces of the module antenna are adjacent to an inner trace of the concentrator, or facing the inner coil of the concentrator.

8. An antenna insert for a contactless or mixed contact and contactless chip card, wherein the antenna insert comprises:

a substrate; and on at least one side of the substrate, coils of a concentrator configured to be electromagnetically coupled to coils of an antenna of an electronic module arranged in a cavity of a chip card body of the chip card, wherein the concentrator comprises at least one inner coil that emerges in the cavity and is flush with inner side walls of the cavity of the chip card body.

9. The antenna insert of claim 8, wherein the antenna insert is configured to be interposed between outer layers of the chip card body.

10. The antenna insert of claim 9, wherein the inner coil of the concentrator of the antenna insert is wider than other coils of the concentrator.

11. The antenna insert of claim 10, wherein a width of the inner coil of the concentrator is greater than a value of a positioning tolerance of the antenna insert between the outer layers of the chip card body.

12. The antenna insert of claim 11, wherein, when the positioning tolerance of the antenna insert in the chip card body is less than 2 mm, the width of the inner coil is greater 2.2 mm.

13. The antenna insert of claim 9, wherein the concentrator is a single-sided antenna, wherein all coils of the single-sided antenna are arranged on a single side of the substrate of the antenna insert, and wherein the single-sided antenna comprises a single inner coil emerging in the cavity of the chip card body.

14. The antenna insert of claim 9, wherein the concentrator of the antenna insert is a two-sided antenna, wherein the coils of the two-sided antenna are distributed between two opposite sides of the substrate of the antenna insert and are connected in series or in parallel using a via, a crimp, or a capacitor, and wherein the concentrator comprises two inner coils emerging in the cavity of the chip card body.

* * * * *